June 6, 1967 I. D. SMITH ET AL 3,323,806
FLUID SEAL
Filed Dec. 14, 1962
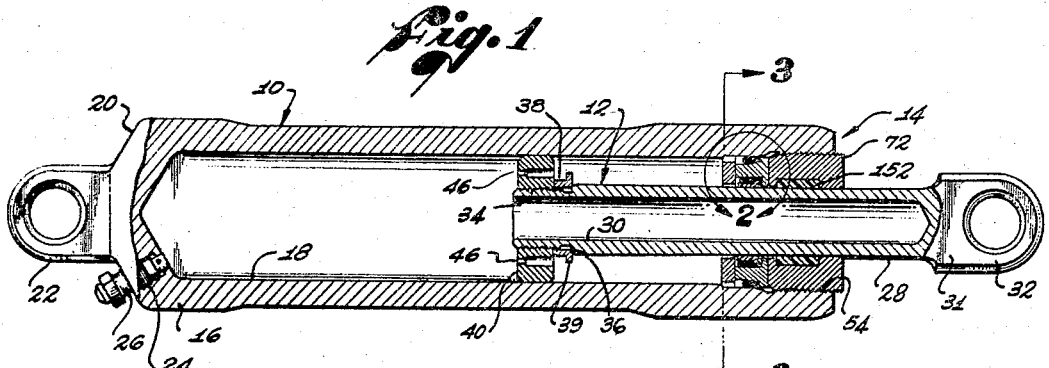
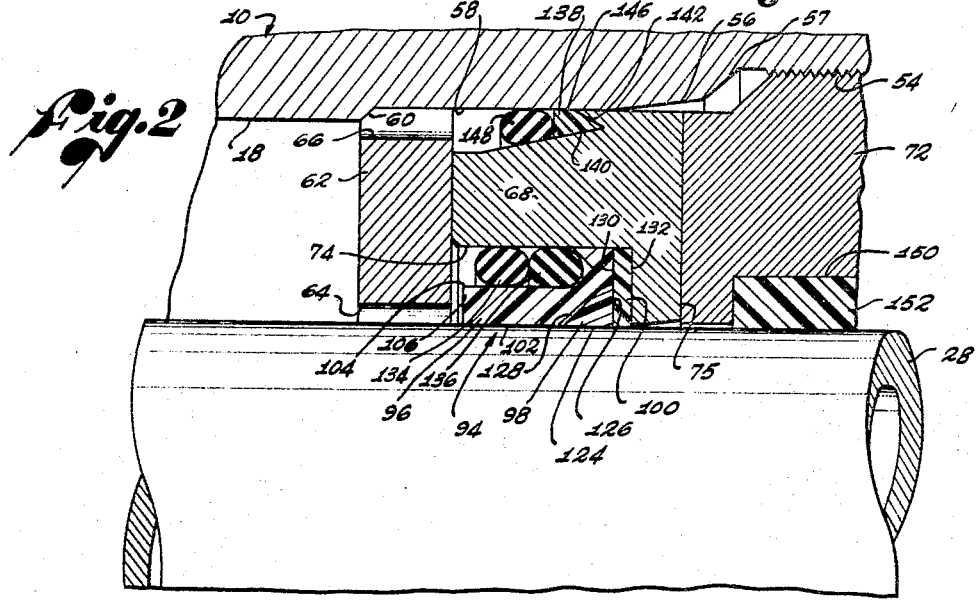
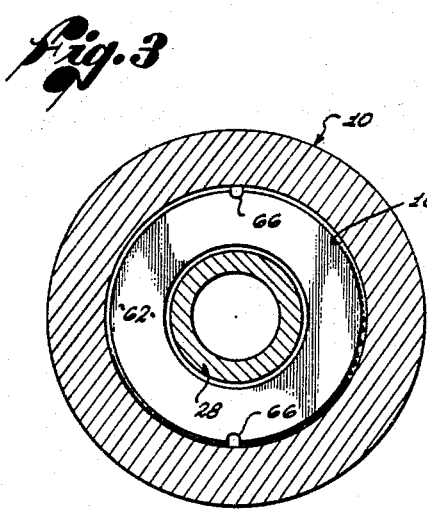
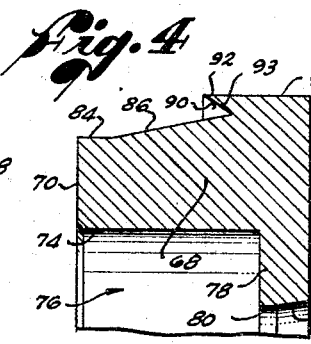
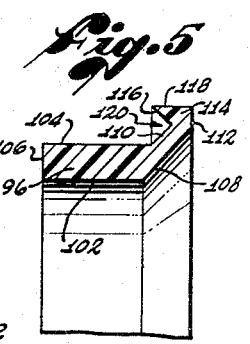
INVENTORS
IRA D. SMITH
ARTHUR L. LINDOW
WILLIAM D. THOMAS
By Zulwider, Patton, Rieber
Lee, and Utecht
ATTORNEYS

# United States Patent Office 3,323,806
Patented June 6, 1967

3,323,806
FLUID SEAL
Ira D. Smith, Claremont, Arthur L. Lindow, Upland, and
William D. Thomas, Claremont, Calif., assignors to
H. W. Loud Machine Works, Inc., a corporation of
California
Filed Dec. 14, 1962, Ser. No. 244,756
8 Claims. (Cl. 277—117)

This invention relates to packing devices for providing fluid seals between relatively moving elements, and more particularly to such devices for effecting extremely high pressure fluid seals between relatively telescoping cylindrical elements, such as between a piston rod and cylinder head.

This invention finds its most important application in connection with actuators, shock absorbers, liquid springs, and the like devices, where the fluids employed therein act under extremely high pressures and over wide pressure and temperature ranges.

Many different kinds of packing devices have been designed and used for such purposes, but it is believed to be the general consensus of those skilled in this art that such previously known devices leave much to be desired in regard to their sealing effectiveness and reliability versus frictional characteristics and durability. Heretofore, such packing devices designed for use under such extremely severe conditions have exhibited a number of defects. For example, some of the packing mechanisms when adjusted to be substantially free of leakage and under dynamic operating conditions, possessed such high frictional characteristics as to interfere with the required and proper movement of the member to be sealed. Other packing mechanisms, while possessing acceptable frictional characteristics, failed to seal satisfactorily either or both under static and dynamic conditions. Still other packing devices initially possessed both low friction and acceptable sealing characteristics, but were so lacking in durability as to be unacceptable where dependability and safety are required.

It is, accordingly, an object of this invention to provide an improved packing device of the before mentioned kind for effecting extremely high pressure fluid seals between relatively slidingly telescoping cylindrical elements.

It is another object of this invention to provide a packing device of the before mentioned kind for effecting extremely high pressure fluid seals between relatively slidingly telescoping cylindrical elements, such as between a piston rod or plunger and a cylindrical head, which possesses substantially improved characteristics including low sliding friction, increased sealing effectiveness, efficiency, and durability.

It is a further object of this invention to furnish a packing assembly for use in connection with so-called hydraulic actuators, shock absorbers, liquid springs, and the like devices, where the differential pressures across such packing means are extremely high and vary over relatively wide ranges.

The objects of this invention are attained in general by a novel arrangement of a plurality of mutually interacting, resilient, non-plastic sealing rings and semi-plastic, non-resilient, low friction sealing rings retained in a specially shaped sealing gland in the cylinder head and positioned thereby in encircling slidable sealing engagement with the outside surface of the piston rod or plunger.

These and other objects, advantages, and features of novelty will be evident hereinafter.

In the drawings, which illustrate a presently preferred embodiment of the invention and in which like reference characters designate the same or similar parts throughout the several views:

FIGURE 1 is a view, partially in longitudinal section and partially in elevation, of a packing assembly constructed in accordance with this invention and showing a typical installation thereof in a liquid spring.

FIGURE 2 is an enlarged, fragmentary, longitudinal sectional view of the rod packing assembly taken within the area 2 of FIGURE 1.

FIGURE 3 is a cross sectional view taken on line 3—3 of FIGURE 1.

FIGURE 4 is an enlarged, fragmentary, radial sectional view of the sealing gland body shown in FIGURE 2.

FIGURE 5 is an enlarged, fragmentary, radial sectional view of one of the seal rings shown in FIGURE 2.

The apparatus is as follows:
Referring first primarily to FIGURE 1, the principal elements of the liquid spring, shown and described herein as typical of the kind of apparatus, to which the present invention finds its most important application, comprise a body or cylinder assembly, shown generally at 10, a plunger assembly, shown generally at 12, and a packing or sealing assembly between the cylinder and plunger, shown generally at 14.

The cylinder assembly, shown generally at 10, includes an elongated cylinder 16 having a coaxial bore 18 closed at one end by an integral head 20 which, in turn, carries an external, integrally formed bearing lug 22 for pivotal attachment to a structural member of a body to be sprung such as, for example, a vehicle or airplane. The plunger end of the cylinder opposite the head 20 is closed around the plunger by the before mentioned sealing or packing assembly 14. The cylinder is provided adjacent the head 20 with a threaded port 24 extending into the bore 18 and into which is threaded a charging valve 26 through which liquid may be introduced into the working space within the liquid spring, as hereinafter more fully described.

The plunger assembly, shown generally at 12, includes an elongated, hollow plunger rod 28 having a coaxial bore 30 open at its inner end and closed at its outer end by an integrally formed end connector 31. The end connector 31 includes a bearing lug 32 for pivotal attachment to a supporting structural member of the body to be sprung such as, for example, the running gear of a vehicle or landing gear of an airplane. The inner end of the plunger rod 28 is formed with a short, externally threaded section 34 of slightly reduced outside diameter, terminating in an axially inwardly facing annular shoulder 36. Fitted over the threaded section 34 of the plunger rod 28 and seated against the annular shoulder 36 is an L-sectioned spacer ring 38 having a radially extending flange 39. Threaded onto the threaded section 34 into securing abutment with the inner edge of the spacer ring 38 is an annular piston 40, the periphery of which slidingly and guidingly engages the cylindrical surface of the cylinder bore 18.

The exterior surface of the plunger rod 28 extending between the outer face of the flange 39 of the valve retainer ring 38 and the inner portion of the plunger rod end connection 31 is preferably hard chromium plated with a ground and polished finish. A plurality of circumferentially spaced apart ducts, as shown at 46, extend axially through the piston 40 from side to side thereof.

In operation, the cylinder and hollow plunger rod is completely filled with liquid under suitable pressure. The cylinder bore 18, plunger rod 28, and sealing assembly 14 define a closed, liquid filled container, the internal volume of which varies proportionally to the volume displacement of the plunger rod, as it moves back and forth through the sealing assembly relative to the cylinder, when subjected to varied axial loading. The liquid in the thus formed container is consequently subjected to proportional elastic compression with accompanying variation in pressure. As a typical example, the range of liquid pressures under which a liquid spring of the type herein illustrated may operate and for which the sealing mechanism of the present invention is especially suited, is from approximately 1,000 to 40,000 lbs. per square inch. In some liquid springs of this type, the maximum pressures occasionally reached are in the order of 50,000 to 60,000 lbs. per square inch. The ducts 46 in the piston 40 serve to permit the necessary flow of displaced fluid back and forth in the cylinder between opposite sides of the piston 40, as the plunger assembly reciprocates relative to the cylinder, and the size and shape of such ducts are carefully determined, such as to result in a predetermined relation between the rate of flow and the resistance to such flow of fluid through these ducts, thereby effecting a correspondingly predetermined damping action in the shock absorber or fluid spring movement, as the case may be.

Various liquids may be employed in the liquid spring depending upon the operating conditions to be encountered and the spring force characteristics desired. Silicone fluids have been found particularly suitable in this connection such as, for example, Dow Corning F4029 or Dow Corning #510 and various mixtures thereof.

From the foregoing, it is apparent that the various working and structural requirements of a fluid seal for satisfactory service in connection with apparatus of the before mentioned kind is extremely severe and exacting.

Reference is now directed primarily to FIGURE 2, in which the sealing assembly 14 of the present invention is shown in more detail. The outer end portion of the cylinder bore 18 is formed with a relatively short, internally threaded section 54 of slightly increased inside diameter relative to the working portion of the cylinder bore and terminating at its inner end in adjoining outwardly facing, coaxial frusto-conical shoulders 56 and 57. Extending axially inwardly for a short distance from the shoulders 56 and 57 is another bore section 58 having an inside diameter intermediate that of the threaded section 54 and the main portion of the cylinder bore 18, such section also terminating at its inner end in a frusto-conical, axially outwardly facing, annular shoulder 60. Contained coaxially within the bore section 58 with its outer edge portion seated against the before mentioned frusto-conical shoulder 60 is an annular gland retainer plate 62. The gland retainer plate 62, which preferably is made of bronze or steel, has an inner bore 64 having an inside diameter, which is greater than the outside diameter of the plunger rod 28 which it surrounds. The gland retainer plate 62 is also provided with a plurality of circumferentially spaced apart grooves extending in an axial direction along its outer periphery, as shown at 66, such grooves serving as fluid pressure equalization ducts for maintaining equal pressure on opposite sides of the gland retainer plate.

Also contained within the cylinder bore section 58 and coaxially encircling the plunger rod 28 is a generally annular gland body 68, which has a complex shape in radial cross section, as is best shown in FIGURES 2 and 4. The gland body 68, which is preferably made of an aluminum bronze alloy, is formed with inner and outer annular end faces 70 and 75, respectively, and is fixed in the assembly with the annular face 70 in firm abutment with the adjacent outwardly facing surface of the gland retainer plate 62 by means of an annular gland nut 72, threaded into the before mentioned outer threaded end section 54 of the cylinder bore and which makes clamping engagement with the outer end face 75 of the gland body 68.

The bore of the gland body 68 is shaped with a coaxial counterbore 74 extending partly therethrough from the inner end face 70 and terminating at its axially outer end in an integral, annular portion 78, thereby forming a rectangular sectioned, radially inwardly facing annular groove 76. The bore of the annular wall portion 78 is formed with a relatively short, inner cylindrical bore portion 80 closely encircling the plunger rod 28, and an adjoining axially, outwardly diverging, chamfered bore portion 82. The clearance between the bore portion 80 and the outside diameter of the plunger rod 28 is preferably between approximately 0.001 and 0.00025 inch. The outer surface of the gland body 68 extending axially outwardly from the annular inner end surface 70, is formed with a concentric cylindrical portion 84 having an outside diameter substantially less than the inside diameter of the adjacent portion of the bore section 58 of the cylinder. Extending axially outwardly from the cylindrical portion 84 of the gland body is an axially, outwardly diverging, frusto-conical portion 86, which terminates at its forward extremity at the apex 88 of an undercut, axially inwardly facing V-shaped groove 90. The V-shaped groove 90 forms at the circumferential line of its intersection with the outside cylindrical surface 91 of the gland body 68 an axially inwardly directed, relatively thin edged annular lip 92.

Contained within the annular groove 76 of the gland body 68 and encircling the plunger rod 28 is a generally annular, non-metallic seal assembly 94. The seal assembly 94 comprises a generally annular main sealing ring 96, an annular wedge ring 98, and a relatively thin annular washer seal 100.

The main seal ring 96 is of irregular shape in radial cross section, as best shown in FIGURES 2 and 5, such ring having a main body portion, which is generally rectangular in radial cross section, formed with an inner cylindrical bore 102 and a concentric outer cylindrical surface 104 joined at its axial inner end by an annular end surface 106. The opposite end portion of the before mentioned rectangular portion is formed with a pair of substantially parallel frusto-conical surfaces 108 and 110, which form outwardly diverging continuations of the surface of the inner bore 102 and outer cylindrical surface 104, respectively. The frusto-conical surface 108 terminates at its outer end in a radially directed, annular end surface 112, and the frusto-conical surface 110 terminates at an apex line 114 formed by its intersection with an inwardly diverging, frusto-conical surface 116. The radially directed, annular, outer end surface 112 and frusto-conical surface 116 meet the outermost cylindrical surface 118 of the seal ring respectively at right angles and at an acute angle. An inwardly directed V-shaped groove 120 surrounded by an axially inwardly directed, thin edged, wedge shaped lip 122 is thereby formed.

The before mentioned wedge shaped ring 98 is formed with an inner cylindrical bore 124, an axially outwardly facing annular end surface 126, and an axially inwardly facing frusto-conical hypotenuse surface 128 being of the same length and shape as the frusto-conical surface 108 of the seal ring 96, whereby in their assembled positions, as shown, end surfaces 108 and 128 are in substantially congruent slidable engagement with one another. The annular washer seal ring 100 is relatively thin axially, having axially inner and outer annular surfaces 130 and 132 substantially equal in radial width to the sum of the radial dimensions of the annular outer surface 126 of the wedge ring 98 and the outwardly facing annular surface 112 of the main seal ring 96, which is also substantially equal to the radial dimensions of the hereinbefore mentioned wall portion 78 of the gland body 68. The inside diameters of bore 102 of the main seal ring 96, bore 124 of the wedge ring 98, and the bore 133 of the washer seal ring 100 are made such that, upon initial assembly, before being subjected to fluid pressure, they make a light slidable fit on the plunger rod 28. The lengths of the inner bore surface 102 of the main seal ring 96, bore surface 124 of the wedge ring 98, and the bore 133 of the washer seal ring 100 are such that, when assembled as shown in FIGURE 2, they make a loose fit lengthwise within the rectangular annular groove 76 between the confronting faces of the gland plate 62 and the wall portion 78 of the gland body 68. The annular inner end surfoce 106 is preferably spaced axially out of contact with the confronting face of the gland plate 62, as shown.

A pair of resilient O-rings 134 and 136 are contained within the annular recess formed around the main seal ring 96 between its cylindrical surface 104 and the opposite inner cylindrical surface 74 of the gland body 68, the size of such O-rings being such that they act in tension to apply a light constricting force to the main seal ring 96 and at the same time make a light press fit within the cylindrical surface 74 of the gland body 68. The constricting force thus applied to the main seal ring 96 is such as to tend to reduce its inside diameter slightly and sufficiently to maintain its bore 102 in sliding engagement with the outside surface of the plunger rod 28.

A generally annular, trapeziform, non-metallic backup ring 138 is seated and partially contained within the before mentioned V-shaped undercut groove 90 formed in the outer portion of the gland body 68. The backup ring is formed with inner and outer frusto-conical intersecting wedge surfaces 140 and 142, an inner radially directed, annular surface 144, and an outer relatively short cylindrical surface 146, the latter having an outside diameter, such as normally to make a light press fit within the bore section 58 of the cylinder. The surfaces 140 and 142 are angled to fit the respective frusto-conical surfaces 86 and 93. A resilient O-ring 148 is contained within the tapered annular recess formed between the bore section 84 of the cylinder and frusto-conical section 86 of the gland body 68.

The seal rings of the seal assembly, namely, rings 96, 98, 100, and 138 are, as before mentioned, non-metallic and are preferably made of a plastic, such as a polymerized tetrafluoro ethylene. This material, as is well known, has an extremely low coefficient of friction on metal surfaces, and it also has plastic characteristics, which permit the material to flow slightly and very slowly under pressure, such as to adjust itself to maintain close sealing engagement with moving metal surfaces, while at the same time maintaining extremely low static and dynamic friction therewith. Polymerized tetrafluoro ethylene suitable for such use may be obtained from E. I. du Pont de Nemours & Co. under the trademark of "Teflon."

The O-rings 134, 136, and 148 are made of a resilient material, such as rubber, neoprene or the like elastomer, which will be substantially unaffected by the fluids with which the sealing apparatus is intended to be used. The bore of the gland nut 72 is formed with an undercut, radially inwardly facing, annular groove 150, which contains an annular plunger rod guide bearing 152. The guide bearing 152 which is preferably also made of Teflon, is split at one point (not shown) in its circumference to permit installation in the groove 150.

In operation, as before mentioned, the liquid spring including the cylinder bore 18 and hollow plunger rod 28, while in its fully axially extended condition, is entirely filled with liquid and pressurized to a suitable initial pressure which, for example, may be in the order of 1,000 lbs. per square inch.

Initially, as before mentioned, under the constricting forces applied by the encircling O-rings 134 and 136 to the cylindrical surface 104 of the Teflon main sealing ring 96, the bore surface 102 thereof is caused to make sealing contact with the outside surface of the plunger rod 28. At the same time, the O-rings 134 and 136 make sealing engagement with and between the surface 104 of the main sealing ring and the inside surface of the counterbore 74 of the gland body 68. The pressure of the liquid in the cylinder is transferred by way of the grooves 64 in the bore of the gland plate 62 to the inner end surface, the cylindrical surface 104 and also by way of O-rings 134 and 136 to the frusto-conical surfaces 110 and 116 of the main seal ring 96. The differential pressure thus applied across the seal assembly 94 results in a force, one component of which tends to move the seal ring 96 axially outwardly toward the end wall 78 of the gland body 68, and this force is transferred to the wedge ring seal 98 and thence through the annular washer ring seal 100 to the inner end surface of the wall portion 78 of the gland body 68. Another component of this force tends to contract the seal rings 96 and 98 circumferentially into increasingly forceful engagement with the exterior surface of the plunger rod 28, such contracting force appearing to have an increasing gradient axially toward the end wall 78 of the gland body 68. The combination of these forces may be considered as tending to extrude the material of the packing rings axially outwardly through the annular clearance space between the bore 80 of the gland body 68 and the outside surface of the plunger rod 28.

The portion of the before mentioned forces, which are transferred by way of O-rings 134 and 136 to the frusto-conical surface 116 tends to force and maintain the lip 122 of the seal ring in firm sealing engagement with the bore 74 of the gland body 68, and any tendency for fluid leakage along this path tends to further augment this sealing action.

It has been discovered that the sealing action and durability of the packing assembly is greatly enhanced by constructing the main sealing assembly 94 of the three separate seal ring components 96, 98, and 100 shaped and positioned together, as herein shown and described, as contrasted with forming the main seal assembly of a single piece having the same or similar overall configuration. For example, it was found that when the latter mentioned one piece unitary construction was attempted, for reasons not fully understood, but possibly because of excessive stiffness thereof, the seal tended to leak slightly, particularly under low static pressure conditions, and also the material of the ring was relatively rapidly extruded axially outwardly through the clearance space between the gland body bore 80 and the plunger rod 28 with consequent rapid mssshaping of the unitary seal ring and rapid deterioration of the sealing ability of the packing assembly. By separation of the main seal ring assembly into at least two separate ring components such as, for example, combining rings 96 and 98 into one integral ring and adding the annular end ring 100, greatly improved sealing and wearing action resulted. However, by separation of the main seal assembly into the three separarate, relatively slidable seal ring components, positioned and shaped as shown at 96, 98, and 100 in FIGURE 2, a different and still further improved sealing and wearing action resulted. First, by use of the separate annular sealing ring 100 positioned between the outer end surfaces 112 and 115 of either an integral ring or the separate seal rings 96 and 98, respectively, and the wall portion 78 of the gland body 68, the wear resulting from reciprocation of the plunger rod 28 is found to be largely confined to the inner edge of the washer ring 100 which bears on the surface of the plunger rod, and as such wear progresses, the ring undergoes slow plastic flow and becomes progressively thinner without change in inside or outside diameter, the plastic flow characteristics of the Teflon material making this possible. Such action results in maintenance of forceful sealing engagement of both outer and inner edges of the washer seal ring 100 with their adjacent metal surfaces. Thus, the wear of the washer seal ring 100 is actually found to be decreased, and such wear as occurs is largely confined to the seal ring 100, and no resultant distortion is communicated therefrom to the adjacent companion seal rings 96 and 98. The ability of seal rings 96 and 98 to slide relative to one another along their mutually contacting conical surfaces 108 and 128 and also to slide along surfaces 112 and 115 relative to the annular face of the seal washer 100 apparently contributes to the distortion-free adjustment and maintenance of sealing forces and contacts between the seal rings and the plunger rod, and permits the seal rings to deform more easily, such as to be more effective in maintaining a seal under low static pressure conditions for extended periods of time without appreciable leakage.

Referring to the outer portion of the packing assembly 94 and gland body 68, the liquid under pressure from the cylinder is transferred by way of the grooves 66 along the periphery of the gland 62 to the annular recess formed between the cylinder bore surface 58 and the opposite surfaces 84 and 86 of the gland body 68. Such fluid pressure acts against the axially inner annular surface 144 of the backup ring 138 forcing it axially outwardly into wedging engagement within the groove 90, thereby deflecting the outer edge of the lip 92 raidally into sealing engagement with the surrounding surface of the bore section 58. Any tendency for leakage of fluid outwardly past the sealing lip 92 will result in wedging movement of the O-ring 148 axially into more firm sealing engagement with the cylinder bore 58 and opposite frusto-conical surface 86 of the gland body 68 and into forceful contact with the axially inner annular surface 144 of the backup ring 138. A secure fluid seal around the outside of the seal assembly 94 is thus assured.

Packing assemblies constructed in accordance with the hereinbefore described invention have been subjected to thorough testing operations. Such testing operations comprise subjecting a liquid spring, containing a packing assembly of the kind hereinbefore described, to several hundred thousands cycles of operation simulating conditions encountered in practical applications. These tests were conducted at temperatures ranging from 65°–170° F. under fluid pressures in the liquid spring ranging from approximately 15,000 to 36,000 lbs. per square inch. At the end of 200,000 such cycles of the liquid spring, the fluid seal was found to be in good, leakage-free condition. This exceeded by at least 150% the life of any other of many packing seals tested, and it was apparent that the packing seal of this invention could be expected to have a satisfactory service life approximately 450% greater than that of any other packing assembly known to the inventor.

It is to be understood that the foregoing is illustrative only and that the invention is not limited thereby, but includes various modifications and changes, which may be made by those skilled in the art without departing from the scope of the invention, as defined in the appended claims.

What is claimed is:

1. In a packing assembly for effecting a fluid seal between a surrounding body and a cylindrical element slidable axially therethrough, apparatus comprising:
   a gland body means having a cylindrical bore through which such cylindrical element coaxially and axially slidably extends;
   a radially inwardly facing, substantially rectangular groove space provided in said bore of said body means, said groove space coaxially encircling said cylindrical element;
   and a sealing ring assembly coaxially contained in said groove space, including:
   a first, generally annular, non-metallic seal ring in said groove space coaxially encircling said element, said first seal ring being formed with a radially outer coaxial surface, an inner axially coaxial bore, an axially inner, inwardly facing annular end surface, and an axially outer, axially outwardly facing annular end surface, said inner bore having an axially inner cylindrical surface portion and a first adjoining axially outer, axially outwardly diverging, frusto-conical surface portion extending therefrom, said inner cylindrical surface portion extending axially outwardly from the radially inner edge of said axially inner end surface and being in slidable engagement with the exterior cylindrical surface of said element, and said first frusto-conical surface portion extending from said cylindrical surface to the radially inner edge of said axially outwardly facing annular end surface, and said outer coaxial surface of said first seal ring having an axially outer cylindrical surface portion extending axially outwardly from the radially outer edge of said axially inner end surface, and a second adjoining axially outer, outwardly diverging, frusto-conical surface portion extending outwardly from said axially inner, radially outwardly facing cylindrical surface portion, said axially inner end surface being adjacent said axially inner end of said groove space and said axially outer end surface being in abutment with the axially outer end of said groove space,
   a second, generally annular, non-metallic seal ring in said groove coaxially encircling said second element, said ring having an axially, inwardly converging, frusto-conical surface, an axially outward, radially directed annular end surface, and a cylindrical bore therethrough, said second ring being positioned with said frusto-conical surface thereof in slidable engagement with said first frusto-conical surface of said first seal ring and with the said annular end surface thereof in abutment with the axially outer end of said rectangular groove space and with said cylindrical bore thereof in slidable engagement with the said exterior cylindrical surface of said element,
   and resilient ring means in said groove space positioned intermediate and in sealing engagement with the said radially outer cylindrical surface of said first seal ring and the inside cylindrical surface of the bottom of said groove space to increase the contact force between said first mentioned bore thereof and said exterior surface of said element.

2. In a packing assembly for effecting a fluid seal between a surrounding body and a cylindrical element slidable axially therethrough, apparatus comprising:
   a gland body means having a cylindrical bore through which such cylindrical element coaxially and axially slidably extends;
   a radially inwardly facing, substantially rectangular groove space formed in said bore of said body means, said groove space encircling said cylindrical element;
   and a sealing ring assembly coaxially contained in said groove space, including:
   a first, generally annular, non-metallic sealing ring in said groove space, said first ring having an irregular sided, radial cross section including:
   a cylindrical bore portion,
   a first coaxial, axially inner annular end face extending radially outwardly from the axially inner end of said cylindrical bore portion,
   a first coaxial, radially outer cylindrical surface portion extending axially outwardly from the outer edge of said axially inner annular end face,
   a first coaxial, axially outwardly diverging, axially inwardly facing frusto-conical surface extending from the axially radially outer edge of said cylindrical outer surface portion,
   a second coaxial, axially inwardly diverging, axially inwardly facing, frusto-conical surface portion extending from the axially outermost edge of said first frusto-conical surface portion, said first and second frusto-conical surface portions intersecting along a coaxial, circular apex line and forming an axially inwardly facing V-shaped groove,
   a second coaxial radially outer cylindrical surface portion extending axially outwardly from the axially inner edge of said second frusto-conical surface portion, said second frusto-conical surface portion and said second coaxial cylindrical surface portion forming an axially inwardly facing thin wedged lip,
   a second coaxial, axially outer, annular end face extending radially inwardly from the axially outer end edge of said second cylindrical surface portion,
   and a third coaxial, axially inwardly converging, axially outwardly facing frusto-conical surface portion extending from the radially inner edge of said second annular end face to the axially outer end of said cylindrical bore portion, said first sealing ring being positioned in said rectangular groove space with said first axially inner, annular end face thereof adjacent the axially inner annular end surface of said groove space and with said second coaxial axially outer annular end surface thereof adjacent the axially outer annular end surface of said groove space, and with said cylindrical bore in slidable engagement with the exterior cylindrical surface of said element, and with said second radially outer cylindrical surface portion of said first seal ring in sealing engagement with the inside cylindrical surface of the bottom of said groove space, and a second, generally annular, non-metallic seal ring in said groove space, said second ring having a radial cross section including:

a fourth axially inwardly converging axially inwardly facing, frusto-conical surface, a third axially outwardly facing, radially directed annular end surface, and a second cylindrical bore therethrough, said second ring being positioned with said fourth frusto-conical surface thereof in slidable engagement with said third frusto-conical surface of said first seal ring and with the said third annular end surface thereof adjacent the said axially outer annular end of said rectangular groove space and with the said second cylindrical bore thereof in slidable engagement with said exterior cylindrical surface of said element;

and resilient ring means in said rectangular groove space positioned intermediate and in sealing engagement with the said first outer cylindrical surface portion of said coaxially sealing ring and the inside cylindrical surface of the bottom of said rectangular groove space adjacent said V-shaped groove in said first seal ring.

3. In a packing assembly for effecting a fluid seal between a surrounding body and a cylindrical element slidable axially therethrough, apparatus comprising:

a gland body means having a cylindrical bore through which such cylindrical element coaxially and axially slidably extends;

a radially inwardly facing, substantially rectangular groove space formed in said bore of said body means, said groove space encircling said cylindrical element;

and a seal coaxially contained in said groove space, including:

a generally annular, non-metallic sealing means in said groove space, said annular sealing means having an irregular sided, radial cross section including:

a cylindrical bore portion, a first coaxial, axially inner, annular end face extending radially outwardly from the axially inner end of said cylindrical bore portion, a first coaxial, radially outer cylindrical surface portion extending axially outwardly from the radially outer edge of said axially inner annular end face, a first coaxial, axially outwardly diverging, axially inwardly facing frusto-conical surface extending from the axially outer edge of said radially outer cylindrical surface portion, a second coaxial, axially inwardly diverging, axially inwardly facing, frusto-conical surface extending from the axially outermost edge of said first frusto-conical surface, said first and second frusto-conical surfaces intersecting along a coaxial, circular apex line and forming an axially inwardly facing V-shaped groove, a second coaxial, redially outer cylindrical surface portion extending axially outwardly from the axially inner edge of said second frusto-conical surface, said second frusto-conical surface and said second coaxial, radially outer cylindrical surface portion forming an axially inwardly facing thin edged lip, a second coaxial, axially outer annular end face extending radially inwardly from the axially outer end edge of said second radially outer cylindrical surface portion, said sealing means being positioned in said rectangular groove space with said second coaxial, axially outer annular end face thereof adjacent the axially outer annular end surface of said groove space, and with said cylindrical bore thereof in slidable engagement with the exterior cylindrical surface of said element, and with said second, radially outer cylindrical surface portion of said seal ring in sealing engagement with the inside cylindrical surface of the bottom of said groove space, and resilient ring means in said rectangular groove space positioned intermediate and in sealing engagement with the said first radially outer cylindrical surface portion of said sealing means and the inside cylindrical face of the bottom of said rectangular groove space adjacent said V-shaped groove in said sealing means.

4. In a packing assembly for effecting a fluid seal between a surrounding body and a cylindrical element slidable axially therethrough, apparatus comprising:

a gland body means having a cylindrical bore through which such cylindrical element coaxially and axially slidably extends;

a radially inwardly facing, substantially rectangular groove space formed in said bore of said body means, said groove space encircling said cylindrical element;

and a seal coaxially contained in said groove space, including:

a generally annular, non-metallic sealing means in said groove space, said annular sealing means having an annular sealing means having an irregular sided, radial cross section including:

a cylindrical bore portion, a first coaxial, axially inner, annular end face extending radially outwardly from the axially inner end of said cylindrical bore portion, a first coaxial, radially outer cylindrical, surface portion extending axially outwardly from the radially outer edge of said axially inner annular end face, a first coaxial, axially outwardly diverging, axially inwardly facing frusto-conical surface extending from the axially outer edge of said radially outer cylindrical surface portion, a second coaxial, axially inwardly diverging, axially inwardly facing, frusto-conical surface extending from the axially outermost edge of said first frusto-conical surface, said first and second frusto-conical surfaces intersecting along a coaxial, circular apex line and forming an axially inwardly facing V-shaped groove, a second coaxial, radially outer cylindrical, surface portion extending axially outwardly from the axially inner edge of said second frusto-conical surface, said second frusto-conical surface and said second coaxial radially outer cylindrical outer surface portion forming an axially inwardly facing thin edged lip, a second coaxial, axially outer annular end face extending radially inwardly from the axially outer end edge of said second radially outer cylindrical surface portion, said sealing means being positioned in said rectangular groove space with said first annular, axially inner annular face thereof adjacent the axially inner annular end surface of said groove space and with said second coaxial axially outer annular end face thereof adjacent the axially outer annular end surface of said groove space, and with said cylindrocal bore thereof in slidable engagement with the exterior cylindrical surface of said element, and with said second radially outer cylindrical surface portion of said seal ring in sealing engagement with the inside cylindrical surface of the bottom of said groove space, and resilient ring means in said rectangular groove space positioned intermediate and in sealing engagement with the said first radial outer cylindrical surface portion of said sealing means and the inside cylindrical surface of the bottom of said rectangular groove space adjacent said V-shaped groove in said sealing means.

5. In a packing assembly for effecting a fluid seal between a surrounding body and a cylindrical element slidable axially therethrough, apparatus comprising:

a gland body means having a cylindrical bore through which such cylindrical element coaxially and axially slidably extends;

a radially inwardly facing, substantially rectangular groove space formed in said bore of said body means, said groove space encircling said cylindrical element;

and a sealing ring assembly coaxially contained in said groove space, including:

a first, generally annular, non-metallic sealing ring in said groove space, said first ring having an irregular sided, radial cross section including:

a cylindrical bore portion, a coaxial axially inner annular end face extending radially outwardly from the axially inner end of said cylindrical bore portion, a coaxial radially outer cylindrical surface portion extending axially outwardly from the the radially outer edge of said inner annular end face, a first coaxial, axially outwardly diverging, axially inwardly facing frusto-conical surface extending from the axially outer edge of said radially outer cylindrical surface portion, a second coaxial, axially inwardly diverging, axially inwardly facing, frusto-conical surface portion extending from the axially outermost edge of said first frusto-conical surface portion, said first and second frusto-conical surface portions intersecting along a coaxial, circular apex line and forming an axially inwardly facing V-shaped groove, a coaxial radially outer cylindrical surface portion extending axially outwardly from the axially inner edge of said second frusto-conical surface portion, said frusto-conical surface portion and said second coaxial radially outer cylindrical surface portion forming an axially inwardly facing thin edged lip, a coaxial, axially outer annular end face extending radially inwardly from the axially outer end edge of said cylindrical surface portion, and a third coaxial, axially inwardly converging, axially outwardly facing, frusto-conical surface portion extending from the inner edge of said annular outer end face to the axially outer end of said cylindrical bore portion, said first sealing ring being positioned in said rectangular groove space with said axially inner annular end face thereof adjacent the axially inner annular end surface of said groove space and with said coaxial axially outer end face thereof adjacent the axially outer annular end surface of said groove space, and with said cylindrical bore in slidable engagement with the exterior cylindrical surface of said element; and with said radially outer cylindrical surface portion of said first seal ring in sealing engagement with the inside cylindrical surface of the bottom of said groove space, and a second, generally annular, non-metallic seal ring in said groove space, said second ring having a radial cross section including:

an axially inwardly converging, axially inwardly facing frusto-conical surface, an axially outward, radially directed annular end surface, and a cylindrical bore therethrough, said second ring being positioned with said frusto-conical surface thereof in slidable engagement with said third frusto-conical surface portion of said first seal ring and with the said cylindrical bore thereof in slidable engagement with said exterior cylindrical surface of said element;

a third annular, non-metallic seal ring in said groove space, said third ring having a radial cross section including:

an axially inner annular end surface, an axially outer annular end surface, a cylindrical bore, and a radially outer circumferential surface, said third ring being positioned with its said axially inner annular end surface in abutment with the said axially outward, radially directed annular end surface of said second seal ring and the said annular axially outer end annular face of said first seal ring, and with its said axially outer annular end surface in abutment with the said axially outer end of said groove space and with said cylindrical bore thereof in sliding encircling engagement with said cylindrical element, and resilient ring means in said rectangular groove space positioned intermediate and in sealing engagement with the said radially outer cylindrical surface portion of said first seal ring and the inside cylindrical surface of the bottom of said rectangular groove space adjacent said V-shaped groove in said first seal ring.

6. Apparatus in accordance with claim 5 in which the non-metallic seal rings are composed of a plastic having the physical properties of polymerized tetrafluoro ethylene.

7. In a packing assembly for effecting a fluid seal between a surrounding body and a cylindrical element slidable axially therethrough, apparatus comprising:

a gland body means having a cylindrical bore through which such cylindrical element coaxially and axially slidably extends;

a radially inwardly facing, substantially rectangular groove space provided in said bore of said body means, said groove space coaxially encircling said cylindrical element;

and a sealing ring assembly coaxially contained in said groove space including:

a first, generally annular, non-metallic seal ring in said groove space coaxially encircling said element, said first seal ring being formed with a radially outer coaxial surface, an inner coaxial bore, an axially inner, axially inwardly facing annular end surface, and an axially outer, axially outwardly facing annular end surface, said inner bore having an axially inner cylindrical surface portion and a first adjoining axially outer, axially outwardly diverging, frusto-conical surface portion extending therefrom, said inner cylindrical surface portion extending axially outwardly from the radially inner edge of said axially inner annular end surface and being in slidable engagement with the exterior cylindrical surface of said element, and said first frusto-conical surface portion extending from said cylindrical surface to the radially inner edge of said axially outwardly facing annular end surface, and said radially outer coaxial surface of said first seal ring having an axially inner, radially outwardly facing, cylindrical surface portion extending axially outwardly from the radially outer edge of said axially inner annular end surface, and a second, adjoining axially outer, axially outwardly diverging, frusto-conical surface portion extending outwardly from said axially inner, radially outwardly facing cylindrical surface portion, said axially inner annular end surface being adjacent said axially inner end of said groove space and said axially outer end surface being in abutment with the axially outer end of said groove space, and a second, generally annular, non-metallic seal ring in said groove coaxially encircling said element, said second ring having an axially, inwardly converging, frusto-conical surface, an axially outward, radially directed annular end surface, and a cylindrical bore therethrough, said second ring being positioned with said frusto-conical surface thereof in slidable engagement with said first, frusto-conical surface of said first seal ring and with the said annular end surface thereof in abutment with the axially outer end of said rectangular groove space and with said cylindrical bore thereof in slidable engagement with the said exterior cylindrical surface of said element.

8. In a packing assembly for effecting a fluid seal between a surrounding body and a cylindrical element slidable axially therethrough, apparatus comprising:

a gland body means having a cylindrical bore through which such cylindrical element coaxially and axially slidably extends;

a radially inwardly facing, substantially rectangular groove formed in said bore of said body means, said groove encircling said cylindrical element;

and a sealing ring assembly coaxially contained in said groove, including:

a first, generally annular, non-metallic sealing ring in said groove, said first ring having an irregular sided, radial cross section including:

a first cylindrical bore portion, a coaxial axially inner annular end face extending radially outwardly from the axially inner end of said cylindrical bore portion;

a first coaxial radially outer cylindrical surface portion extending axially outwardly from the radially outer edge of said inner annular end face;

a first coaxial, axially outwardly diverging, axially inwardly facing frusto-conical surface extending from the axially outer edge of said radially outer cylindrical surface portion, a second coaxial, axially inwardly diverging axially inwardly facing, frusto-conical surface portion extending from the axially outermost edge of said first frusto-conical surface portion, said first and second frusto-conical surface portions intersecting along a coaxial, circular apex line and forming an axially inwardly facing V-shaped groove, a second coaxial radially outer cylindrical surface portion extending axially outwardly from the axially inner edge of said second frusto-conical surface portion, said second frusto-conical surface portion and said coaxial radially outer cylindrical surface portion forming an axially inwardly facing thin edged lip, a coaxial, axially outer annular end face extending radially inwardly from the axially outer end edge of said cylindrical surface portion, and a third coaxial, axially inwardly converging, axially outwardly facing, frusto-conical surface portion extending from the inner edge of said annular outer end face to the axially outer end of said cylindrical bore portion, said first sealing ring being positioned in said rectangular groove with said axially inner annular end face thereof adjacent the axially inner annular end surface of said groove and with said coaxial axially outer end face thereof adjacent the axially outer annular end surface of said groove, and with said cylindrical bore in slidable engagement with the exterior cylindrical surface of said element;

and with said second coaxial radially outer cylindrical surface portion of said first seal ring in sealing engagement with the inside cylindrical surface of the bottom of said groove, and a second, generally annular, non-metallic seal ring in said groove, said second ring having a radial cross section including:

an axially inwardly converging axially inwardly facing, frusto-conical surface, an axially outward, radially directed annular end surface, and a cylindrical bore therethrough, said second ring being positioned with said frusto-conical surface thereof in slidable engagement with said third frusto-conical surface portion of said first seal ring and with the said cylindrical bore thereof in slidable engagement with said exterior cylindrical surface of said element;

and a third annular, non-metallic seal ring in said groove, said third ring having a radial cross section including:

an axially inner annular end surface, an axially outer annular end surface, a cylindrical bore, and a radially outer circumferential surface, said third ring being postioned with its said axially inner annular end surface in abutment with the said axially outward, radially directed annular end surface of said second seal ring, and the said axially outer annular end annular face of said first seal ring, and with its said axially outer annular end surface in abutment with the said axially outer end of said groove and with said cylindrical bore thereof in sliding encircling engagement with said cylindrical element.

References Cited

UNITED STATES PATENTS

| | | | |
|---|---|---|---|
| 1,725,836 | 8/1929 | Solberg | 277—188 |
| 2,420,104 | 5/1947 | Smith | 277—176 |
| 2,513,533 | 7/1950 | Thornhill | 277—165 |
| 2,728,620 | 12/1955 | Krueger | 277—188 |
| 2,825,590 | 3/1958 | Sutherland | 277—35 X |
| 2,892,645 | 6/1959 | Tydeman | 277—78 |
| 2,973,978 | 3/1961 | Oppenheim | 277—188 |
| 3,011,803 | 12/1961 | Buckner et al. | 277—165 X |
| 3,033,578 | 5/1962 | Kellogg | 277—78 |
| 3,071,386 | 1/1963 | Scannell | 277—177 |
| 3,076,658 | 2/1963 | Leman | 277—121 |

FOREIGN PATENTS

| | | |
|---|---|---|
| 1,196,448 | 5/1959 | France. |
| 630,024 | 10/1949 | Great Britain. |

LAVERNE D. GEIGER, *Primary Examiner.*

S. ROTHBERG, EDWARD V. BENHAM, *Examiners.*

L. J. RANEY, J. S. MEDNICK, *Assistant Examiners.*

UNITED STATES PATENT OFFICE
CERTIFICATE OF CORRECTION

Patent No. 3,323,806                     June 6, 1967

Ira D. Smith et al.

It is hereby certified that error appears in the above numbered patent requiring correction and that the said Letters Patent should read as corrected below.

Column 9, line 35, for "first" read -- coaxially --; line 36, for "coaxially" read -- first --; line 71, for "redially" read -- radially --; column 10, lines 37 and 38, strike out "having an annular sealing means"; line 71, before "face" insert -- end --; column 11, line 1, for "cylindrocal" read -- cylindrical --; column 12, line 23, for "outer end annular" read -- outer annular end --; column 13, line 12, for "therethruogh" read -- therethrough --.

Signed and sealed this 25th day of February 1969.

(SEAL)
Attest:

Edward M. Fletcher, Jr.                        EDWARD J. BRENNER
Attesting Officer                                Commissioner of Patents